UNITED STATES PATENT OFFICE.

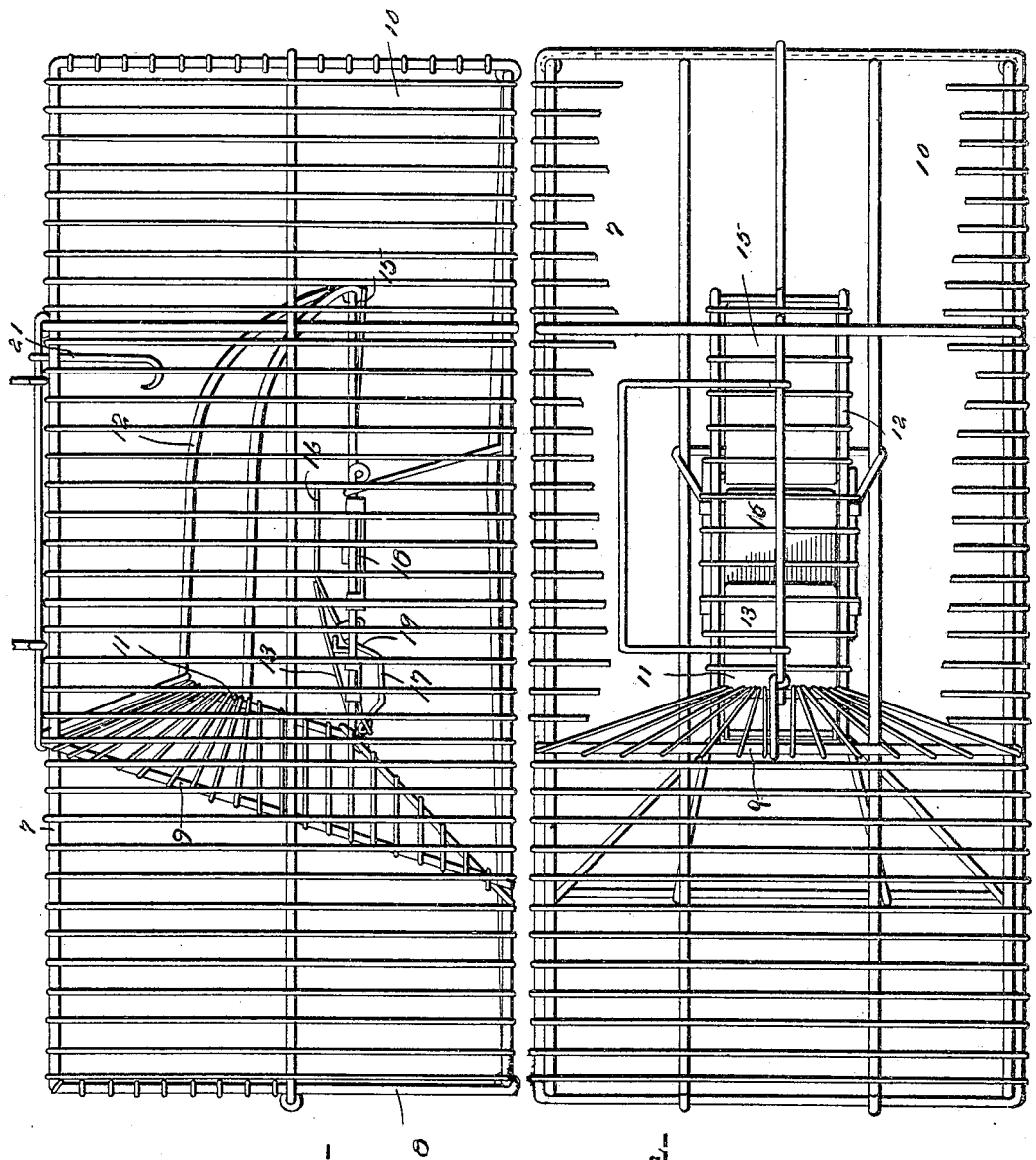

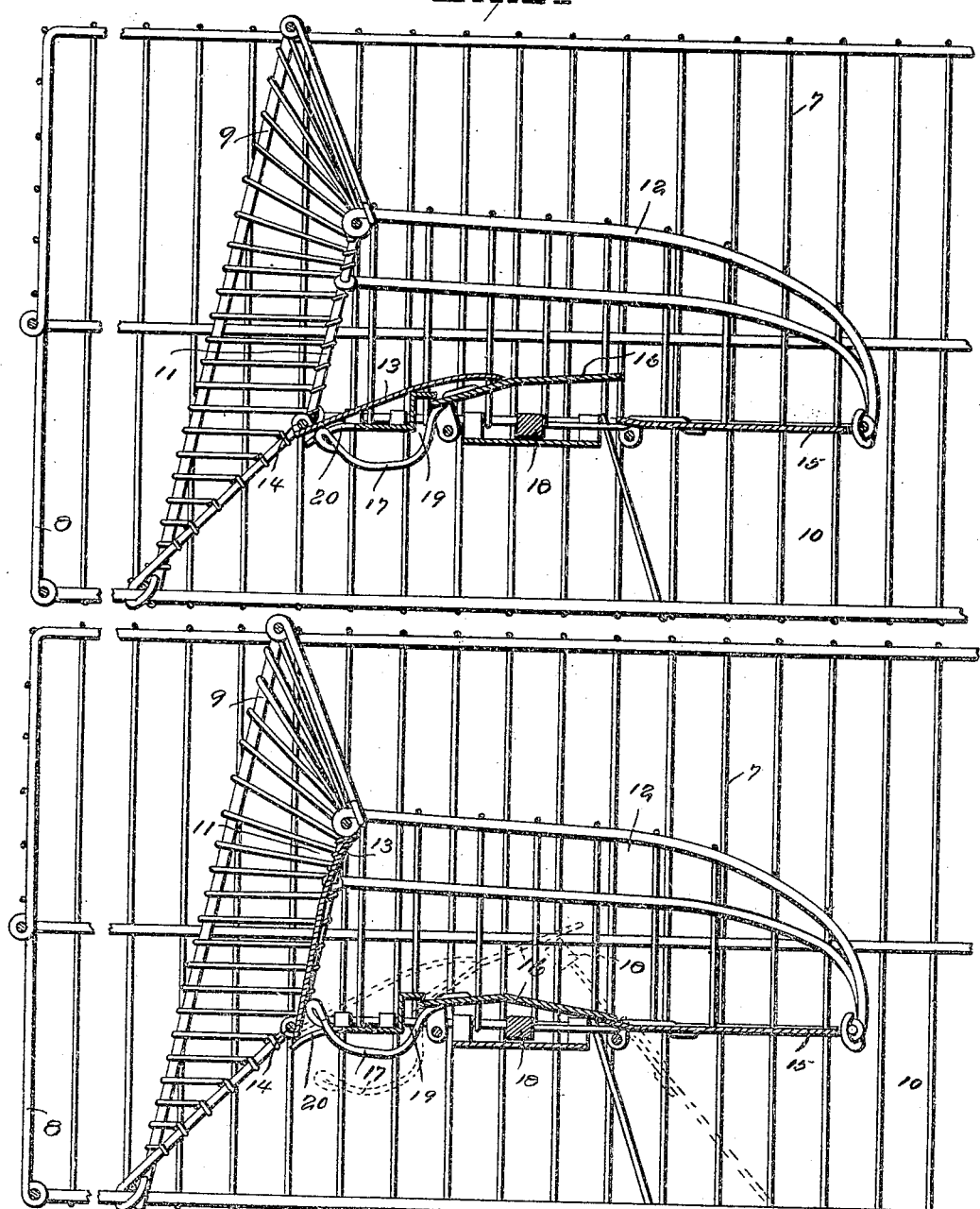

DAVID M. CAIN, OF CAINESVILLE, MISSOURI, ASSIGNOR OF ONE-HALF TO CHESLY B. WOODWARD, OF CAINESVILLE, MISSOURI.

ANIMAL-TRAP.

No. 801,212.      Specification of Letters Patent.      Patented Oct. 10, 1905.

Application filed May 27, 1905. Serial No. 262,633.

*To all whom it may concern:*

Be it known that I, DAVID M. CAIN, a citizen of the United States, residing at Cainesville, in the county of Harrison and State of Missouri, have invented new and useful Improvements in Animal-Traps, of which the following is a specification.

My invention is an animal-trap, and more particularly one which is reset by the victim.

The object of the invention is to provide a trap of this kind embodying simplicity of construction and efficiency of operation.

In the accompanying drawings, Figure 1 is an elevation of the trap set, and Fig. 2 is a top plan view thereof. Fig. 3 is a central vertical section. Fig. 4 is a vertical section showing the parts in another position.

Referring specifically to the drawings, 7 denotes a cage made of wire or other suitable material. The cage is open at one end, as at 8, which is the entrance, and near that end also has a partition 9, which forms a chamber 10 to receive the animals. The partition 9 has an opening 11, which is the entrance to a second chamber 12, arranged within the chamber 10 and spaced from the floor of the latter. The entrance 11 is provided with a door 13, which is hinged at the bottom, as at 14, and opens inwardly. At the rear end thereof the floor of the chamber 12 has a trap-door 15, which opens downwardly into the chamber 10. Between the doors 13 and 15 is a tilting platform 16, which is pivoted to the floor of the chamber 12 and has at one end a projecting arm 17, the free end of which engages behind the door 13 to close the same, as will be hereinafter described. The trap-door 15 is held normally closed by a counterweight 18, which extends under the platform 16. The arm 17 extends downwardly from the platform 16, through an opening 19 in the floor of the chamber 12, and back through a slot 20 in the floor into engagement with the door 13.

In Figs. 1 and 3 the position of the parts when the trap is set is clearly shown. The door 13 is open, and the trap-door 15 is closed. Above the trap-door is a hook or other device 21 to support the bait. The animal, attracted by the bait, enters the chamber 12 and upon stepping on the platform 16 depresses the same, causing the arm 17 to swing upwardly and close the door 13, as shown in Fig. 4, whereby the animal's escape is cut off. As the arm 17 extends under the floor of the chamber 12, it cannot be reached by the animal in said chamber to tilt the platform 16, and thus reopen the door 13. Upon stepping on the trap-door 15 the animal is dropped into the chamber 10. When the trap-door swings down, the counterweight 18 strikes the bottom of the platform 16 and lifts the same, which removes the arm 17 from behind the door 13 and permits the latter to drop down by gravity, whereby the chamber 12 is again opened and the trap reset. That part of the partition 9 leading to the opening 11 is inclined to enable the animal to readily ascend the same to reach the chamber 12.

A trap constructed as herein described is reliable and efficient in operation and requires no attention except baiting and emptying. As the counterweight 18 is not accessible to the animal in the chamber 10, the trap-door 15 cannot be pushed open by the animal.

Having thus described my invention, what is claimed as new, and desired to be secured by Letters Patent, is—

1. An animal-trap comprising two chambers, one of which has a door closing its inlet; a tilting platform inside of said door, and having means for closing the door when the platform is depressed; a trap-door under the end of the platform, and arranged to open into the other chamber; and means carried by the trap-door to elevate the platform and release the inlet-door when the trap-door opens.

2. An animal-trap comprising two chambers, one of which has a door closing its inlet, and a trap-door communicating with the other chamber; a tilting platform between the doors, and having a projecting arm at one end engaging the inlet-door to shut it when the platform is depressed; a counterweight carried by the trap-door for holding it normally closed, said counterweight striking the platform when the trap-door opens and elevating the platform to disengage the arm from the inlet-door.

In testimony whereof I have signed my name to this specification in the presence of two subscribing witnesses.

DAVID M. CAIN.

Witnesses:
C. R. WILSON,
C. H. WOODWARD.